(12) United States Patent
Yamamoto et al.

(10) Patent No.: US 9,536,639 B2
(45) Date of Patent: Jan. 3, 2017

(54) WIRE HARNESS (71) Applicant: Sumitomo Wiring Systems, Ltd, Yokkaichi, Mie (JP)

(72) Inventors: Morichika Yamamoto, Yokkaichi (JP); Masataka Wakabayashi, Yokkaichi (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/015,895

(22) Filed: Feb. 4, 2016

(65) Prior Publication Data
US 2016/0240282 A1 Aug. 18, 2016

(30) Foreign Application Priority Data

Feb. 16, 2015 (JP) ................................. 2015-027664

(51) Int. Cl.
*H01B 7/282* (2006.01)
*H01B 7/00* (2006.01)
*B60R 16/02* (2006.01)
*H01B 7/02* (2006.01)

(52) U.S. Cl.
CPC ......... *H01B 7/2825* (2013.01); *B60R 16/0215* (2013.01); *H01B 7/0045* (2013.01); *H01B 7/025* (2013.01)

(58) Field of Classification Search
USPC ...................................................... 174/72 A
See application file for complete search history.

(56) References Cited

U.S. PATENT DOCUMENTS

| 4,939,317 | A | * | 7/1990 | Hostler | ............... | H01B 11/1847 174/107 |
| 5,641,942 | A | | 6/1997 | Iriyama et al. | | |
| 6,444,309 | B1 | * | 9/2002 | Hashimoto | ......... | B60R 16/0215 428/131 |
| 7,094,970 | B2 | * | 8/2006 | Kihira | ................. | B60L 11/1803 174/74 R |
| 7,435,899 | B2 | * | 10/2008 | Okada | .................. | H02G 3/0468 174/36 |
| 8,530,743 | B2 | * | 9/2013 | Mori | .................... | B60R 16/0215 174/72 A |

(Continued)

FOREIGN PATENT DOCUMENTS

JP H07-105742 A 4/1995
WO 2004-061032 A1 7/2004

*Primary Examiner* — Timothy Thompson
*Assistant Examiner* — Michael F McAllister
(74) *Attorney, Agent, or Firm* — Dinsmore & Shohl LLP (57) ABSTRACT

A wire harness is provided in which, by merely overlap wrapping a binding tape member around a group of lead wires, intruding water can be guided to the outside. The wire harness includes a group of lead wires and a binding tape-type protection portion that covers the group of lead wires. The binding tape-type protection portion is formed by overlap wrapping a binding tape member around the group of lead wires, the binding tape member having a tape member body made of a synthetic resin and an adhesive layer formed on one surface of the tape member body. The tape member body has a plurality of water drain holes that are provided so as to penetrate the wall of the tape member body in the width direction, and that are provided in the lengthwise direction.

3 Claims, 6 Drawing Sheets (56) References Cited

U.S. PATENT DOCUMENTS

2004/0099427 A1* 5/2004 Kihira ................ B60L 11/1803
 174/359
2010/0032088 A1 2/2010 Kato et al.
2010/0236827 A1* 9/2010 Doi ........................ C09J 7/0296
 174/72 A

* cited by examiner

PRIOR ART

PRIOR ART

WIRE HARNESS

CROSS-REFERENCE TO RELATED APPLICATIONS

This application claims priority of Japanese Patent Application No. JP2015-027664 filed Feb. 16, 2015.

FIELD OF THE INVENTION

The present invention relates to a wire harness for protecting a group of lead wires using a binding tape member.

BACKGROUND OF THE INVENTION

Figure 6:
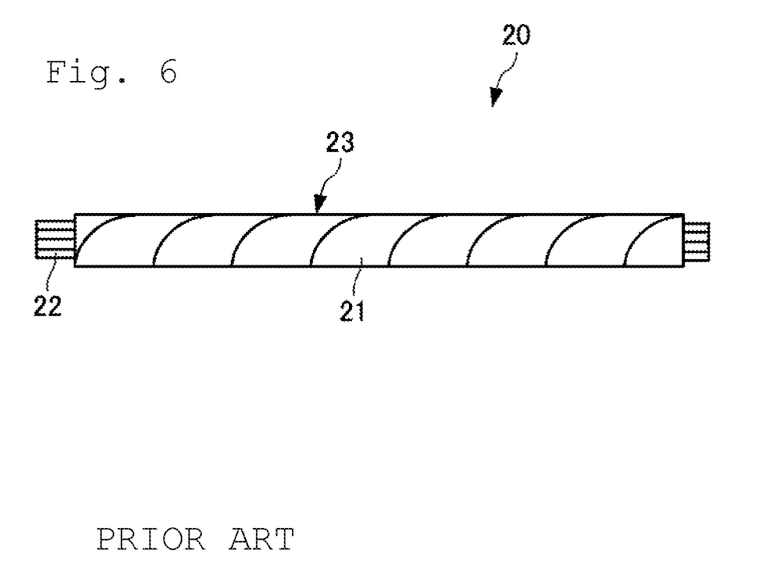
FIG. 6 is a front view of a wire harness according to a conventional example.

As shown in FIG. 6, conventionally, in a wire harness 20 of this type, a binding tape member 21 is constituted by a flat band-shaped tape body, which is made of vinyl chloride, and an adhesive layer provided on the inner surface of the tape body, and the binding tape member 21 is used to form a binding tape-type protection portion 23 that is overlap wrapped around a group of lead wires 22, thus protecting the group of lead wires 22 (e.g., see JP H7-105742A).

FIG. 4 in JP H7-105742A shows an example of related art.

However, in the case where the wire harness 20 disclosed in JP H7-105742A is routed outside a vehicle compartment, if rainwater or carwash water comes into contact with a branch line, it is possible for the water to travel along the branch line and enter the trunk line via a branch portion. In a conventional wire harness in which a binding tape member is half-overlap wrapped around the group of lead wires, there is a problem in that water that has entered the wire harness cannot easily flow back out, and such water remains between lead wires.

The present invention was achieved in order to solve the problems described above, and an object thereof is to provide a wire harness in which intruding water can be guided to the outside by merely overlap wrapping a binding tape member around a group of lead wires.

SUMMARY OF THE INVENTION

In order to achieve the above object, a wire harness according to the present invention includes: a group of lead wires; and a binding tape-type protection portion that covers the group of lead wires, wherein the binding tape-type protection portion is formed by overlap wrapping a binding tape member around the group of lead wires, the binding tape member having a tape member body made of a synthetic resin and an adhesive layer formed on the tape member body, and the tape member body has a plurality of water drain holes that are provided so as to penetrate a wall of the tape member body in a width direction, and that are provided in a lengthwise direction.

According to this configuration, with the wire harness according to the present invention, the binding tape member has multiple water drain holes that are provided so as to penetrate the wall in the width direction and are provided in the lengthwise direction. Accordingly, the binding tape-type protection portion, which is formed by overlap wrapping the binding tape member around the group of lead wires, has multiple water drain holes that put the interior and exterior into communication. Since the water drain holes located on the lower surface side of the wire harness are in an inclined state of descending from the interior toward the exterior, water that has intruded into the wire harness and is traveling along the bottom portion can be guided to the outside by the water drain holes.

Also, with the wire harness according to the present invention, the water drain holes located on the upper surface side are in an inclined state of descending from the outside toward the inside, but the inward half of the overlap wrapping is pressed down by the outer half that is layered on top, and therefore even if water comes into contact with the binding tape-type protection portion during car washing or the like, the car washing water is blocked by the outer peripheral portion of the water drain holes so as to not enter in a large quantity in a short time. Little water enters the interior, and such water can then be guided to the outside through the water drain holes located on the lower surface side of the wire harness.

The wire harness according to the present invention may have a configuration in which the water drain holes are each formed so as to have a trapezoidal space in a view from a direction perpendicular to a tape surface, and so as to have a first hole end formed at one end in the width direction and a second hole end that is smaller than the first hole end and formed at another end in the width direction, and the first hole end is located at an inner end in the width direction of the tape member body. Also, the wire harness according to the present invention may have a configuration in which the water drain holes are each formed so as to have a W-shaped space in a view from a direction perpendicular to a tape surface, and so as to have a first hole end formed at one end in the width direction and two or more second hole ends that are smaller than the first hole end and formed at another end in the width direction, and the first hole end is located at an inner end in the width direction of the tape member body.

According to this configuration, with the wire harness according to the present invention, the first hole end located at the inner end of the water drain holes is larger relative to the second hole, and therefore a large amount of water that has intruded can be collected inside the water drain holes and drained efficiently. Also, the second hole end located at the outer end is smaller relative to the first hole, and therefore even if water comes into contact with the binding tape-type protection portion during car washing or the like, the car washing water is even less likely to intrude.

According to the present invention, it is possible to provide a wire harness in which intruding water can be guided to the outside by merely overlap wrapping a binding tape member around a group of lead wires.

DETAILED DESCRIPTION OF THE PREFERRED EMBODIMENTS

An embodiment of the present invention will be described below with reference to the drawings.

Figure 1:
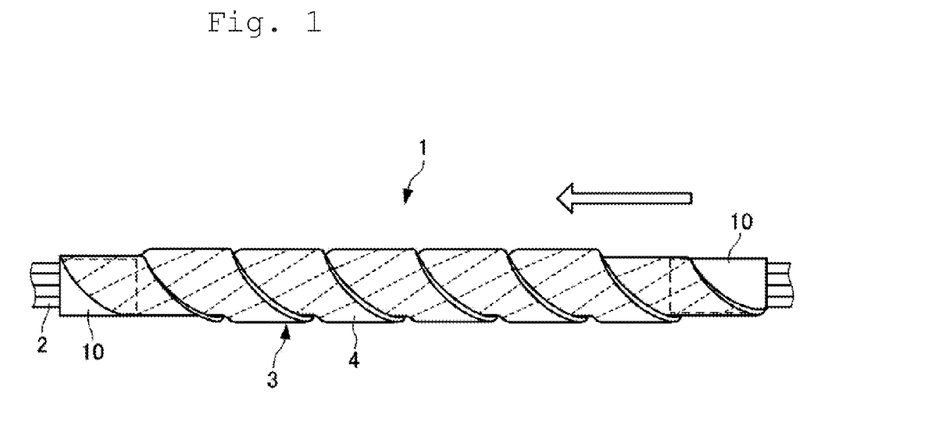
FIG. 1 is a front view of a wire harness according to an embodiment of the present invention.

FIG. 1 is an illustrative view of a first embodiment of the wire harness 1. The wire harness 1 of the present embodiment includes a group of lead wires 2 and a binding tape-type protection portion 3 that covers the group of lead wires 2. The wire harness 1 of the present embodiment is suitable as a wire harness that is routed outside a vehicle compartment.

The group of lead wires 2 is shown here as a bundle of sheathed electrical lines, but may be a bundle that includes multiple sheathed electrical lines and one bare electrical line. Furthermore, the group of lead wires 2 may be a shielded electrical line.

As shown in FIG. 1, the binding tape member 4 is a binding member that, by being wrapped over half of itself (spiral wrapped) and around the group of lead wires 2 so as to progress in the direction shown by the arrow, forms the binding tape-type protection portion 3 that covers the group of lead wires 2. Note that it is preferable that before overlapping half of itself when wrapping is performed, temporary binding adhesive tape 10 is used for temporary binding in the regions that correspond to the two ends in half-overlap wrapping.

Figure 2A:
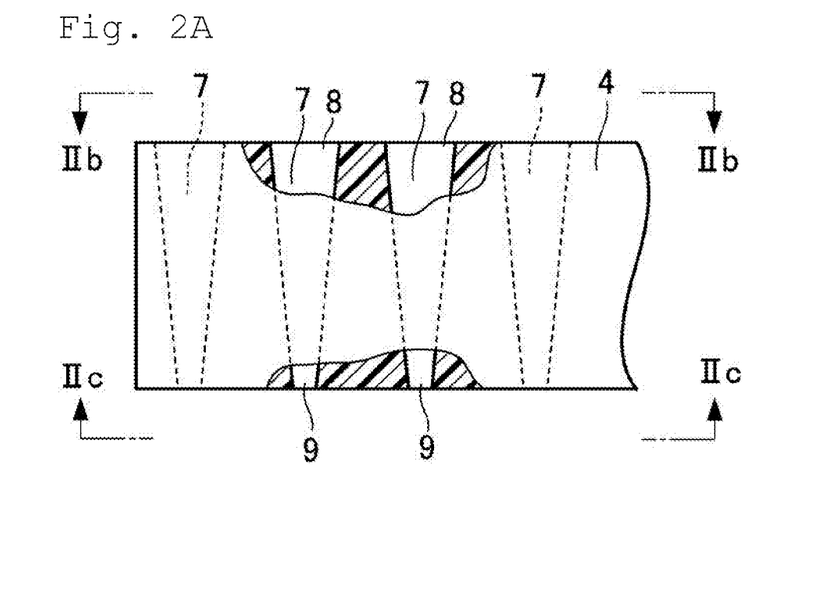
FIG. 2A is a front view of the binding tape member used in the wire harness according to the embodiments of the present invention.
Figure 2B:
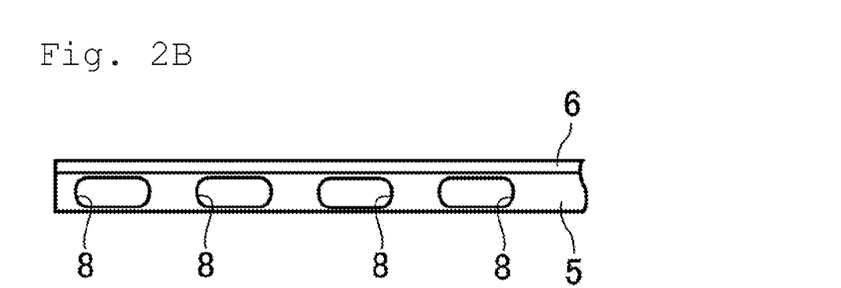
FIG. 2B is a cross-sectional view of FIG. 2A taken along lines IIb-IIb
Figure 2C:
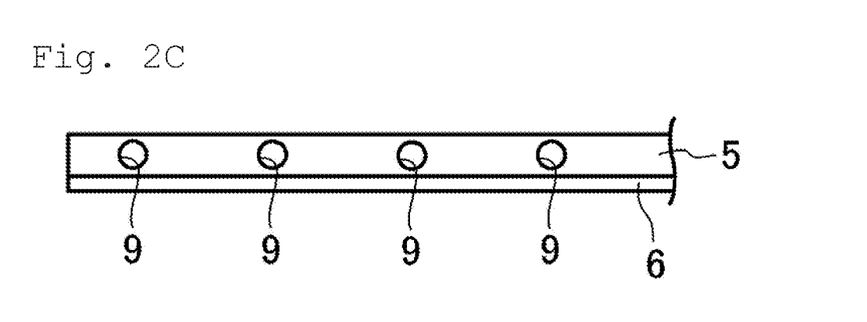
FIG. 2C is a cross-sectional view of FIG. 2A taken along lines IIc-IIc.

As shown in FIGS. 2A to 2C, the binding tape member 4 has a tape member body 5 made of a synthetic resin and an adhesive layer 6 formed on one surface of the tape member body 5. The tape member body 5 has multiple water drain holes 7 that are provided so as to penetrate the wall in the width direction and are provided in the lengthwise direction. For clarity, the term "half-overlap wrapping") as used herein refers to wrapping in which the tape member body overlaps itself half of the tape width.

The adhesive layer 6 is formed over the entire width of one surface (the inner surface side) of the tape member body 5, and release paper is affixed to the adhesive layer 6 before being wrapped around the group of lead wires 2. There are no particular limitations on the type of adhesive. The adhesive layer 6 may be constituted by affixing double-sided adhesive tape to the tape member body 5.

In the case of the configuration in which release paper is affixed to the adhesive layer 6 before being wrapped around the group of lead wires 2, the release paper is peeled off while the tape member body 5 is wrapped around the group of lead wires 2.

The binding tape-type protection portion 3 that covers the group of lead wires 2 is formed by half-overlap wrapping the binding tape member 4 around the group of lead wires 2. The water drain holes 7 that put the interior of the wire harness 1 into communication with the outside are formed in the binding tape-type protection portion 3.

Figure 3:
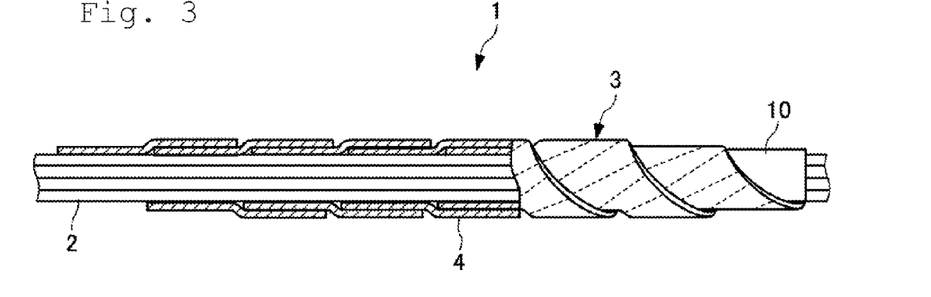
FIG. 3 is a front view that shows part of a half-overlap wrapping portion of the wire harness according to the embodiment of the present invention, with a portion cut away to show the cross-sectional structure.

As shown in FIGS. 2A to 2C, the water drain holes 7 are formed such that a first hole end 8 is larger than a second hole end 9, and are formed so as to have a trapezoidal space in a view from a direction perpendicular to the tape surface. As shown in FIG. 3, the binding tape-type protection portion 3 is wrapped such that the first hole ends 8 are hidden in the half-overlap wrapping and thus located inside the space facing the group of lead wires 2.

The tape member body 5 is molded using a resin selected from among polypropylene, nylon, polyethylene, polyimide, amide-imide, ester imide, epoxy, and urethane.

The tape member body 5 has a thickness of 0.8 to 1.5 mm, a width of 19 to 40 mm, and a length of 0.4 to 1 m, for example, but these dimensions are determined as necessary in consideration of user-convenience, speed, covering length, and the like.

In order to form the water drain holes 7 in the wall of the binding tape member 4, for example, a male mold and a female mold are used to form a cavity that is a rectangular flattened space portion, such cavities are formed evenly in the three-dimensional space occupying the exterior of the binding tape member 4, cores corresponding to the water drain holes 7 are provided so as to be able to move into and out of the cavities, the molds are filled with a thermoplastic resin, the resin is allowed to cure, and then the cores are pulled out.

Next, a method for manufacturing the wire harness 1 having the above configuration will be briefly described.

Figure 4:
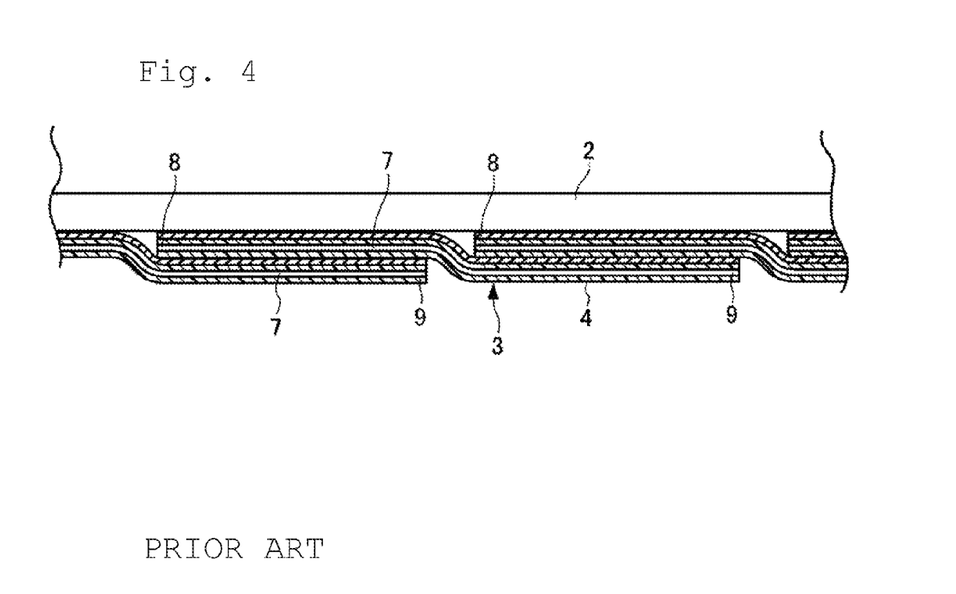
FIG. 4 is an enlarged cross-sectional view of a portion of FIG. 3.

As shown in FIGS. 3 and 4, the group of lead wires 2, the binding tape member 4, and the temporary binding adhesive tape 10 are prepared, the regions of the group of lead wires 2 that correspond to the two ends in half-overlap wrapping are temporarily bound using the temporary adhesive tape 10, and then the binding tape member 4 is half-overlap wrapped (spiral wrapped) around the group of lead wires 2 to form the binding tape-type protection portion 3 that covers the group of lead wires 2, thus completing the manufacture of the wire harness 1.

In the half-overlap wrapping operation, the binding tape member 4 is normally wrapped rightward around the group of lead wires 2, but regardless of whether rightward wrapping or leftward wrapping is performed, it is wrapped such that the first hole ends 8 of the water drain holes 7 are hidden.

Next, actions and effects of the wire harness 1 having the above configuration will be described.

According to the wire harness 1 of the first embodiment, the binding tape member 4 has multiple water drain holes 7 that are provided so as to penetrate the wall in the width direction and are provided in the lengthwise direction. Accordingly, the binding tape-type protection portion 3, which is formed by half-overlap wrapping the binding tape member 4 around the group of lead wires 2, has multiple water drain holes 7 that put the interior and exterior into communication. Since the water drain holes 7 located on the lower surface side of the wire harness 1 are in an inclined state of descending from the inside toward the outside, water that has intruded into the wire harness 1 and is traveling along the bottom portion can be guided to the outside by the water drain holes 7.

Also, according to the wire harness 1 of the first embodiment, the water drain holes 7 located on the upper surface side are in an inclined state of descending from the outside toward the inside, but the inward half of the half-overlap wrapping is pressed down by the outer half that is layered on top, and therefore even if water comes into contact with the binding tape-type protection portion 3 during rainfall, car washing, or the like, the car washing water is blocked by the outer peripheral portion of the water drain holes 7 so as to not enter in a large quantity in a short time. Little water enters the interior, and such water can then be guided to the outside through the water drain holes 7 located on the lower surface side of the wire harness 1.

Furthermore, according to the wire harness 1 of the first embodiment, the water drain holes 7 have a first hole end 8 larger than a second hole end 9, and therefore a large amount of water that has intruded can be collected inside the water drain holes 7 and drained efficiently. Also, the second hole end 9 is smaller than the first hole end 8, and therefore even if water comes into contact with the binding tape-type protection portion 3 during car washing or the like, the car washing water is even less likely to intrude.

Figure 5A:
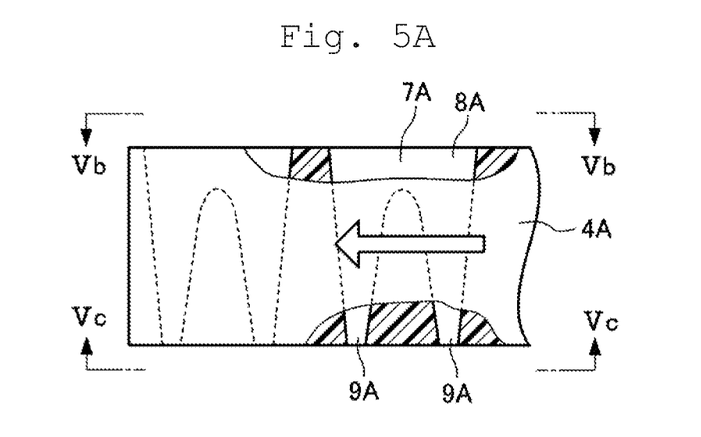
FIG. 5A is a front view of a second embodiment of a binding tape member used in a wire harness
Figure 5B:
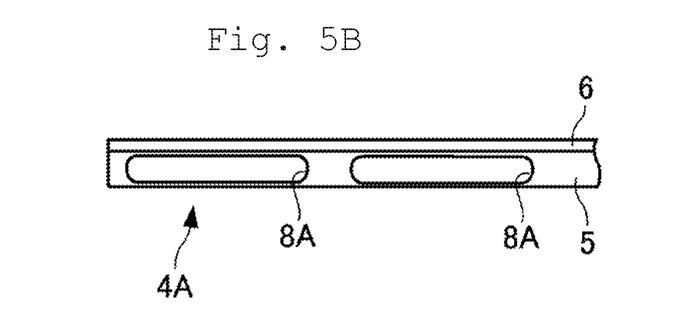
FIG. 5B is cross-sectional view of FIG. 5A taken along lines Vb-Vb.
Figure 5C:
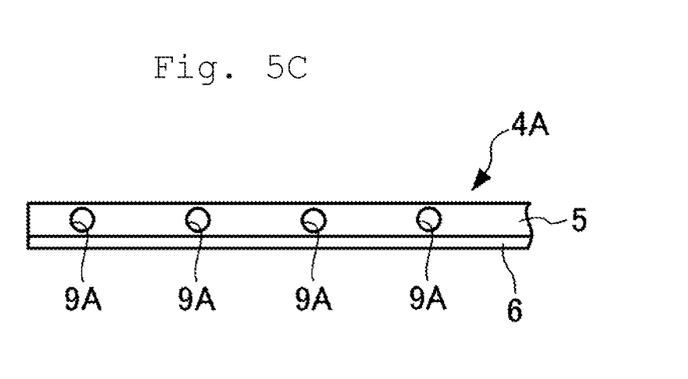
FIG. 5C is a cross-sectional view of FIG. 5A taken along lines Vc-Vc.

FIGS. 5A to 5C are front views of a binding tape member 4A according to a wire harness of a second embodiment. The binding tape member 4A has a tape member body 5 that is made of a synthetic resin, and an adhesive layer 6 formed on the tape member body 5. Water drain holes 7A are provided in the tape member body 5. Each water drain hole 7A is formed so as to have a first hole end 8A at one end in the width direction, and two second hole ends 9A at the other end in the width direction that are smaller than the first hole end 8A, and so as to have a W-shaped space in a view from a direction perpendicular to the tape surface.

Specifically, the first hole end 8A and the two second hole ends 9A of the water drain hole 7A are formed in the wall of the tape member body 5. The first hole end 8A is located at one end in the width direction of the tape member body 5, and penetrates the wall of the tape member body 5 with a size of ½ to 1 times the tape width. The two second hole ends 9A are located at the other end in the width direction, and are smaller than the first hole end 8A, for example 2 to 5 mm. The wall portion between the two second hole ends 9A protrudes toward the center of the first hole end 8A to approximately half the tape width in the shape of a peninsula, and thus the water drain hole 7A has a W-shaped space in the wall of the tape member body 5 in a view from a direction perpendicular to the tape surface.

Similarly to the first embodiment, the binding tape-type protection portion is formed by the binding tape member 4A being half-overlap wrapped around the group of lead wires. The first hole ends 8A of the water drain holes 7A are wrapped so as to be hidden in the half-overlap wrapping, and are located at the inner end in the width direction of the tape member body 5. The tape-type protection portion includes multiple water drain holes 7A in which the large-opening first hole end 8A faces the interior of the wire harness and the two small-opening second hole ends 9A face the outside of the wire harness.

According to the wire harness of the second embodiment, by merely half-overlap wrapping the binding tape member 4A around the group of lead wires, intruding water can be guided to the outside via the water drain holes. In particular, in the water drain holes, the large-opening first hole end 8A faces the interior of the wire harness, and the two small-opening second hole ends 9A face the outside of the wire harness, and therefore a larger amount of intruding water can be collected in the water drain holes and efficiently drained. Also, since the second hole ends 9A that face the outside are small, if water comes into contact with the binding tape-type protection portion during rainfall, car washing, or the like, the water is even less likely to intrude.

The present invention is not limited to the embodiments described above, and the technical scope of the present invention described in the claims encompasses aspects modified in design in various ways without departing from the gist of the invention.

Although the second embodiment describes an example in which a W-shaped space having the first hole end 8A and the two second hole ends 9A is formed in the wall of the tape member body 5, this is an example of an aspect in which two trapezoidal spaces of the first embodiment, each having a first hole end 8 and a second hole end 9, are provided adjacently so as to be integrated, but the present invention may have a configuration in which three or more trapezoidal spaces of the first embodiment, each having a first hole end 8 and a second hole end 9, are provided adjacently so as to form an integrated space.

The present invention also encompasses the case where the water drain holes are formed so as to penetrate in the tape width direction and have a space whose cross-sectional shape perpendicular to the hole direction is rectangular or elongated.

In the binding tape member of the wire harness according to the present invention, the water drain holes are not limited to an aspect having a trapezoidal space or an aspect having a W-shaped space in a view from a direction perpendicular to the tape surface.

The wire harness according to the present invention is not limited to a configuration in which the binding tape member is half-overlap wrapped around the group of lead wires, and also encompasses overlap wrapping in which the wrapping width is larger than or smaller than half-overlap wrapping. Specifically, the present invention also encompasses the case of performing overlap wrapping of the binding tape member around the group of lead wires in which the ratio of the overlap wrapping width is, for example, ⅓ to ¾ the tape width.

As described above, the present invention has an effect in which by merely overlap wrapping the binding tape member around the group of lead wires, intruding water can be guided to the outside, and the present invention is useful to general wire harnesses that are routed outside a vehicle compartment.

What is claimed is:

1. A wire harness comprising:
 a group of lead wires; and
 a binding tape-type protection portion that covers the group of lead wires,
 wherein the binding tape-type protection portion is formed by overlap wrapping a binding tape member around the group of lead wires, the binding tape member having a tape member body made of a synthetic resin and an adhesive layer formed on the tape member body, and
 the tape member body has a plurality of water drain holes that are provided so as to penetrate a wall of the tape member body in a width direction, and that are provided in a lengthwise direction.

2. The wire harness according to claim 1, wherein the water drain holes are each formed so as to have a trapezoidal space in a view from a direction perpendicular to a tape surface, and so as to have a first hole end formed at one end in the width direction and a second hole end that is smaller than the first hole end and formed at another end in the width direction, and the first hole end is located at an inner end in the width direction of the tape member body.

3. The wire harness according to claim 1, wherein the water drain holes are each formed so as to have a W-shaped space in a view from a direction perpendicular to a tape surface, and so as to have a first hole end formed at one end in the width direction and two or more second hole ends that are smaller than the first hole end and formed at another end in the width direction, and the first hole end is located at an inner end in the width direction of the tape member body.

* * * * *